A. WORK.
Hose-Coupling.
No. 213,274. Patented Mar. 11, 1879.
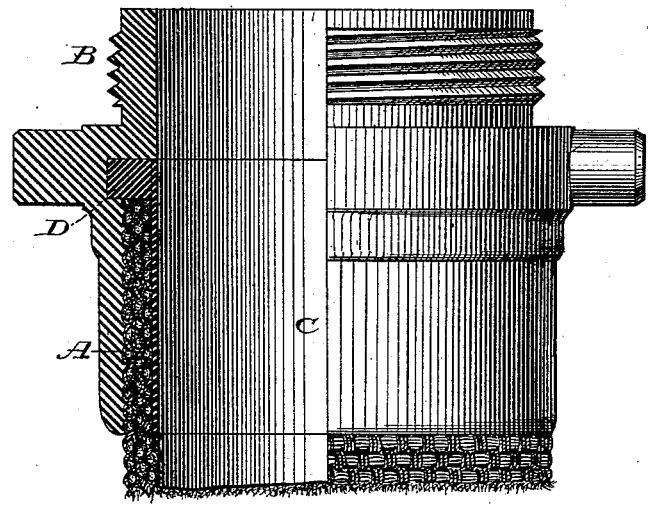

UNITED STATES PATENT OFFICE.

ALANSON WORK, OF PROVIDENCE, RHODE ISLAND.

IMPROVEMENT IN HOSE-COUPLINGS.

Specification forming part of Letters Patent No. 213,274, dated March 11, 1879; application filed November 25, 1878.

*To all whom it may concern:*

Be it known that I, ALANSON WORK, of the city and county of Providence, and State of Rhode Island, have invented a new and useful Improvement in Hose-Couplings; and I do hereby declare that the following is a full, clear, and exact description of the construction and operation of the same, reference being had to the accompanying drawing, making a part of this specification, and to the letters of reference marked thereon.

The drawing is a representation of a longitudinal section of my hose-coupling.

My improvement relates more particularly to that portion of the coupling by means of which the attachment to the hose is effected.

This coupling is adapted more especially for use upon that class of hose known as "fabric hose," and in which a heavy weft-cord forms a continuous spiral, with intervening spaces of diminished thickness.

A represents the band which encompasses the hose. This band terminates in the male screw B, or in any other of the well-known forms of coupling attachment. Upon the inner circumference of the band is cut a thread, of a shape, height, and pitch suited to mesh between the weft-cords. This thread is either right or left handed, according as the hose is woven with a right or left hand spiral, and is rounded at the point, so as to prevent any cutting of the hose.

The band is fitted so as to screw snugly over the hose, the weft-cords lying continuously in the grooves between the threads. Within the hose is then expanded, by any suitable means, the ring C, in a manner more particularly described in various Letters Patent heretofore issued to me. This ring is of brass or other ductile metal, and, when expanded, clamps the hose securely to the band.

It will be seen that the entire length of the thread within the band forms a retaining-shoulder, and prevents any longitudinal movement between the hose and band, no matter how great the pressure.

D is a rubber capping-ring, which is compressed by the expansion of the brass ring, and prevents all moisture from penetrating to the fabric of the hose when it is lined with rubber, as is ordinarily the case. This feature also forms the subject of Letters Patent previously granted to me.

I am aware that internally-corrugated bands have been used, both with spiral and parallel corrugations, for the purpose of corrugating the hose in order to increase the friction. It will be observed, however, in my device that no corrugations are made in the body of the hose; but I simply provide corrugations upon the inside of the band to correspond with the projecting weft-threads of the hose, and then force them into position by a suitable clamping device.

Having thus described my invention, what I claim as new, and desire to secure by Letters Patent, is—

In a hose-coupling, an encompassing-band with a thread cut upon its interior surface, whose pitch nearly or quite corresponds with the pitch of the weft-cords in the hose, in combination with an inner clamping device, substantially as described.

ALANSON WORK.

Witnesses:
HENRY R. DAVIS,
JOHN PEIRCE.